United States Patent
Hasbrouck

[15] 3,667,491
[45] June 6, 1972

[54] FUNCTION GENERATOR USING FLUID AMPLIFIERS

[72] Inventor: Thad M. Hasbrouck, Wethersfield, Conn.

[73] Assignee: United Aircraft Corporation, East Hartford, Conn.

[22] Filed: May 4, 1970

[21] Appl. No.: 34,287

[52] U.S. Cl. ..................................................... 137/81.5
[51] Int. Cl. ............................................ F15c 1/14, F15c 4/00
[58] Field of Search ................................................ 137/81.5

[56] References Cited

UNITED STATES PATENTS

| 3,530,870 | 9/1970 | Hoglund | 137/81.5 |
| 3,548,795 | 12/1970 | Howland | 137/81.5 X |
| 3,559,559 | 2/1971 | Furlong | 137/81.5 X |

Primary Examiner—William R. Cline
Attorney—Norman Friedland

[57] ABSTRACT

The function generator generates a nonlinear open loop schedule summing by a fluid amplifier the outputs of two or more fluid amplifiers that are both responsive to two or more independent variables.

4 Claims, 2 Drawing Figures

INVENTOR
THAD M. HASBROUCK
BY Norman Friedland
ATTORNEY 3,667,491

FUNCTION GENERATOR USING FLUID AMPLIFIERS

BACKGROUND OF THE INVENTION

This invention relates to means for generating a non-linear function of two or more variables by use of fluid amplifiers in order to get an output signal which is indicative of the desired function.

As is well known in the art, complicated mechanical hardware, cams, linkages, and the like and/or electronic circuitry is generally used for generating non-linear functions of two or more variables. With the advent of fluid amplifiers the possibility of generating these functions fluidically has become prevalent inasmuch as such devices afford the advantage of not requiring moving parts. Additionally, it eliminates the necessity for cams and linkages and other electrical means for generating functions.

I have found that by the proper selection and connection of fluid amplifiers, it is possible to produce a signal from two or more variables which is indicative of a non-linear function of that signal. In many control applications, particularly for air inlet controls for aircraft, it is desirable to control the area of the inlet and the bypass doors of the inlet as some function which is produced by two or more variables and which function is non-linear. Such a device as described hereinbelow serves that purpose very well.

SUMMARY OF THE INVENTION

The primary object of this invention is to provide with the use of fluid amplifiers means for generating a non-linear function of two or more variables so as to provide an output signal which is indicative of the desired function.

A still further object of this invention is to provide with the use of fluid amplifiers means for generating a function in such a manner as to provide a control which is characterized as being light in weight, having no moving parts, being less expensive, is operative over a wide temperature range and affords high reliability.

Other features and advantages will be apparent from the specification and claims and from the accompanying drawings which illustrate an embodiment of the invention.

DESCRIPTION OF THE PREFERRED EMBODIMENT

Figure 1:
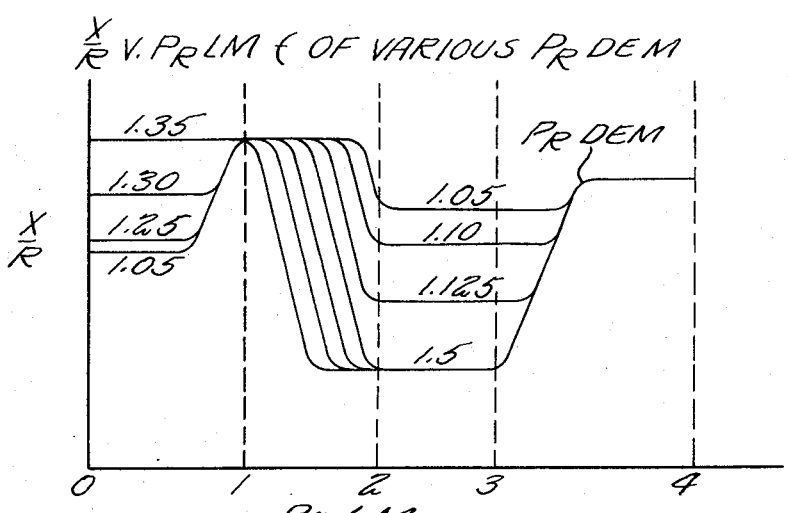
FIG. 1 is a graph representation of the desired output of the function generator.

Reference is now made to FIG. 1, illustrating the type of signal which typifies function generators made in accordance with this invention. For the sake of explanation purposes the graph in FIG. 1 represents the type of signal that is utilized on an air inlet control for the air inlet used in connection with a jet engine for high speed aircraft. It is illustrative of how this invention can be adapted for such an application and as would be obvious to those skilled in the art, this invention has application in other embodiments.

For additional information about air inlet controls reference is hereby made to U.S. Pat. No. 3,181,817 granted to M. Marcus et al., and entitled "Air Inlet Control". This patent essentially shows an asymmetrical spike moved rectilinearly within a convex-concave nozzle varying the throat area within the nozzle at the inlet of a jet type of engine and bypass doors for bleeding out excessive air.

As noted in FIG. 1, the spike schedule of this control (X/R) is plotted against the local Mach pressure ratio (Prlm) for various diffuser exit Mach pressure ratios (Prdem). The particular sensors necessary to supply the proper signal to actuate the function generator are omitted herefrom for the sake of convenience and clarity but for further detail of typical sensors reference is hereby made to the U.S. Pat. No. 3,181,817 referenced above.

Figure 2:
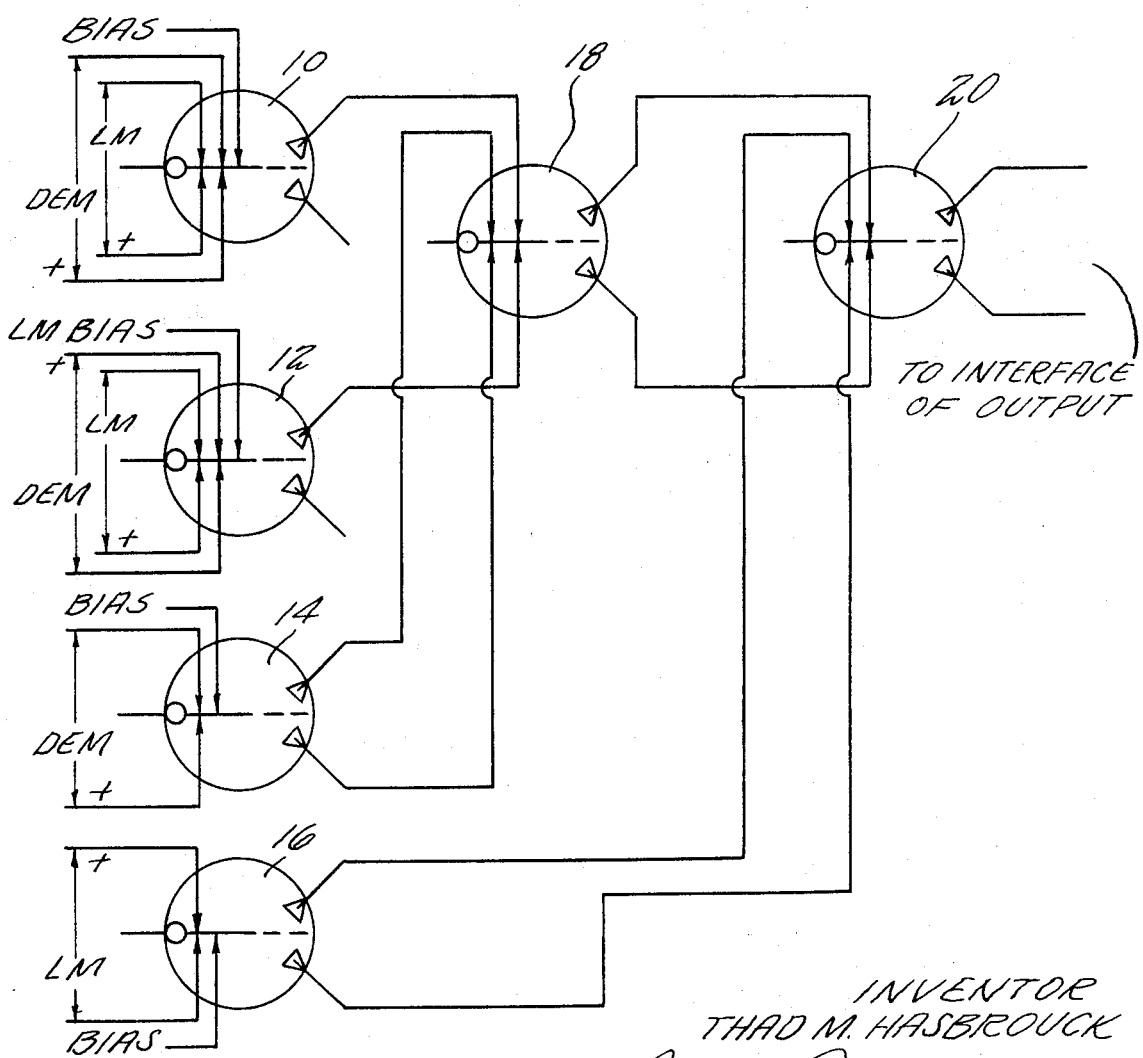
FIG. 2 is a schematic illustration of the preferred embodiment of this invention.

Referring now to FIG. 2, the sensors are suitably connected to fluid amplifiers 10, 12, 14, and 16 which cooperate with fluid amplifiers 18 and 20 for producing a non-linear function of the two variables, i.e., local Mach number and diffuser exit Mach number.

Suitable fluid amplifiers would be of the proportional type operating in an analogue mode. Fluid amplifiers 10, 12 include six control ports having one of the control ports blocked off; fluid amplifiers 14 and 16 include four control ports also having one of the ports blocked off and fluid amplifiers 18 and 20 would have four control ports all of which are used. The gain of the fluid amplifiers is preascertained and is dictated by the particular slope of the control signal desired to be generated by the function generator. Fluid amplifiers with these characteristics are well known as for example reference is made to U.S. Pat. No. 3,111,291 granted to B. M. Horton on Nov. 19, 1963 and the detailed description thereof is omitted herefrom for the sake of convenience and clarity.

As noted from FIG. 2, a pressure differential indicative of the local Mach Number (L.M.) is imposed across the first set of control ports of fluid amplifier 10 and the pressure differential signal indicative of the diffuser exit Mach pressure ratio (DEM) is imposed across the second set of control ports. A pressure bias signal is applied to the fifth control port. Thus between 0 and station 1 shown in FIG. 1 fluid amplifier 10 dictates the shape of the non-linear function curve. The bias fixes the horizontal portion of the curve and establishes the level of X/R for the low L.M. and DEM.

It is apparent from the foregoing that as L.M. increases it overcomes the bias and X/R starts to rise. However, if DEM increases, it has the effect of shifting the bias and moving the region where L.M. becomes effective. The output of fluid amplifier 10 is a pressure input to a control port of fluid amplifier 18. Obviously, this is a function of the area on the graphical representation of FIG. 1 from stations 0 – 1.

Fluid amplifier 12 operates in a similar fashion to fluid amplifier 10 except that its bias is provided to prevent operation until station 1 has been reached. Fluid amplifier 12 has a higher gain with respect to fluid amplifier 10 and its output is fed into a control port of fluid amplifier 18. As L.M. goes through station 1 to 2, fluid amplifier 12, biased by DEM as shown, reduces the output of fluid amplifier 10 through fluid amplifier 18 according to the desired schedule.

Fluid amplifier 14, controlled by DEM and an L.M. bias, is used for X/R signals in the regime from station 2 – 3. Here, fluid amplifier 14 supplies a biasing function which adjusts the level of X/R with DEM and L.M. The output of fluid amplifier 14 is a differential pressure signal to control ports of fluid amplifier 18.

Fluid amplifier 18 then has an output which is indicative of X/R through stations 0 through 3. It is apparent from the foregoing that the output of fluid amplifiers 10, 12 and 14 are summed by fluid amplifier 18, the output being from stations 0–3.

The output of fluid amplifier 18 is fed to the control ports of fluid amplifier 20. Fluid amplifier 16 is used in the regime from station 3 to 4 being biased such that it is not turned on until station 3 is reached. In this regime the L.M. signal is fed to fluid amplifier 20 to cancel the output of fluid amplifier 18 in the manner shown. The output of fluid amplifier 20 is therefore a pressure difference indicative of the desired schedule of X/R vs L.M. through the regime from stations 0 to 4. Obviously, the output of fluid amplifier 20 is the summation of the outputs of fluid amplifiers 18 and 16. It is therefore apparent that the output signal of fluid amplifier 20 may be then used to provide signals to a hydraulic actuator or other power amplifying means through an interface not shown.

It is contemplated by this invention that the fluid amplifier would be preferably made up of individual stacked modules comprising all of the fluid amplifier functions stated above. What has been shown is a device characterized as having no moving parts for producing a non-linear signal indicative of two variables.

It should be understood that the invention is not limited to the particular embodiments shown and described herein, but that various changes and modifications may be made without departing from the spirit or scope of this novel concept as defined by the following claims.

In the claims:

1. A fluid amplifier function generator for generating a nonlinear signal as a function of at least two variables wherein the output desired includes a negative and positive nonlinear function relative to any given reference,
   a first proportional type of fluid amplifier including means including control ports responding to said two variables,
   a second proportional type of fluid amplifier also including means having control ports responsive to said two variables and having the flow from the power stream biased to a nonoperative output channel,
   biasing means for overcoming the bias on said second proportional type of fluid amplifier at the junction point between said negative and positive nonlinear function, and
   a third proportional type of fluid amplifier operatively connected in phase relationship to the operative output channels of said first and second fluid amplifier for summing the outputs thereof for producing a nonlinear signal indicative of a nonlinear function of said two variables.

2. A fluid amplifier function generator as claimed in claim 1 wherein the output of said first proportional type of fluid amplifier is a pressure signal applied to a control port of said third fluid amplifier and the output of said second fluid amplifier is a pressure signal applied to another control port of said third fluid amplifier.

3. A fluid amplifier function generator as claimed in claim 2 including a fourth proportional type of fluid amplifier responsive to at least one of said variables and biased by the other of said variables, the outputs of said fourth proportional type of fluid amplifier being pressure signals applied to opposed control ports in said third fluid amplifier.

4. A fluid amplifier as claimed in claim 3 including means for producing a still further portion of the nonlinear function including fifth and sixth proportional types of fluid amplifiers wherein said fifth proportional type of fluid amplifier has its control ports connected to the output channels of said third fluid amplifier and said sixth proportional type of fluid amplifier has its output channels connected with opposed control ports of said fifth proportional type of fluid amplifier, said fifth fluid amplifier being rendered inoperative by a bias applied to said sixth fluid amplifier, and rendered operative as a function of at least one of said variables.

* * * * *